United States Patent
Swab

(10) Patent No.: US 10,704,438 B2
(45) Date of Patent: Jul. 7, 2020

(54) TEMPERATURE CONTROL OF EXHAUST GAS OF A TRANSPORTATION REFRIGERATION UNIT

(71) Applicant: Carrier Corporation, Farmington, CT (US)

(72) Inventor: Michael Swab, Acworth, GA (US)

(73) Assignee: Carrier Corporation, Palm Beach Gardens, FL (US)

(*) Notice: Subject to any disclaimer, the term of this patent is extended or adjusted under 35 U.S.C. 154(b) by 51 days.

(21) Appl. No.: 15/777,052

(22) PCT Filed: Oct. 31, 2016

(86) PCT No.: PCT/US2016/059658
§ 371 (c)(1),
(2) Date: May 17, 2018

(87) PCT Pub. No.: WO2017/087144
PCT Pub. Date: May 26, 2017

(65) Prior Publication Data
US 2018/0355775 A1    Dec. 13, 2018

Related U.S. Application Data

(60) Provisional application No. 62/256,493, filed on Nov. 17, 2015.

(51) Int. Cl.
*F01N 3/05* (2006.01)
*F01N 13/08* (2010.01)
*F25D 11/00* (2006.01)

(52) U.S. Cl.
CPC .............. *F01N 3/05* (2013.01); *F01N 13/082* (2013.01); *F25D 11/003* (2013.01);
(Continued)

(58) Field of Classification Search
CPC combination set(s) only.
See application file for complete search history.

(56) References Cited

U.S. PATENT DOCUMENTS

| 877,431 A | 1/1908 | Jones |
| 2,886,121 A | 5/1959 | Welbourn |

(Continued)

FOREIGN PATENT DOCUMENTS

| CN | 102146828 A | 8/2011 |
| DE | 3735059 A1 | 4/1989 |

(Continued)

OTHER PUBLICATIONS

International Search Report for International Application No. PCT/US2016/059658; International Filing Date Oct. 31, 2016; dated Dec. 19, 2016; 6 Pages.

(Continued)

*Primary Examiner* — Binh Q Tran
(74) *Attorney, Agent, or Firm* — Cantor Colburn LLP

(57) ABSTRACT

A transportation refrigeration unit includes an evaporator circulating a flow of refrigerant therethrough to cool a flow of supply air flowing over the evaporator, a compressor in fluid communication with the evaporator to compress the flow of refrigerant, and an engine operably connected to the compressor to drive operation of the compressor. The engine includes an exhaust pathway to direct an exhaust gas flow from the transportation refrigeration unit, and a nozzle extending circumferentially around the exhaust pathway defining a nozzle flowpath between the exhaust pathway and the nozzle, the nozzle configured to flow a cooling airflow along the nozzle flowpath to reduce a temperature of the exhaust gas flow.

15 Claims, 5 Drawing Sheets

(52) U.S. Cl.
CPC ...... *F01N 2240/20* (2013.01); *F01N 2270/02* (2013.01); *F01N 2590/08* (2013.01); *Y02T 10/20* (2013.01)

(56) References Cited

U.S. PATENT DOCUMENTS

| | | | |
|---|---|---|---|
| 2,913,871 | A | 11/1959 | Bradwhaw |
| 3,045,421 | A | 7/1962 | Pagliuca |
| 3,543,510 | A | 12/1970 | Kaufmann, Jr. |
| 4,313,523 | A | 2/1982 | Copen |
| 5,014,512 | A | 5/1991 | Kakuta |
| 5,962,822 | A | 10/1999 | May |
| 7,051,524 | B1 | 5/2006 | Kraft |
| 7,461,506 | B2 | 12/2008 | McNally et al. |
| 7,487,633 | B2 | 2/2009 | Popik et al. |
| 7,637,099 | B2 | 12/2009 | Ranganathan et al. |
| 7,645,432 | B1 | 1/2010 | Solomon |
| 7,669,411 | B2 | 3/2010 | Mallampalli et al. |
| 7,757,482 | B2 | 7/2010 | Li et al. |
| 7,762,064 | B2 | 7/2010 | Tennison |
| 7,793,495 | B2 | 9/2010 | Bradley et al. |
| 7,833,301 | B2 | 11/2010 | Schindler et al. |
| 7,845,465 | B2 | 12/2010 | Baumgartner |
| 7,913,489 | B2 | 3/2011 | Angoshtari et al. |
| 7,987,666 | B2 | 8/2011 | Branning et al. |
| 8,001,775 | B2 | 8/2011 | Krajewski et al. |
| 8,056,327 | B2 | 11/2011 | Brown et al. |
| 8,109,083 | B2 | 2/2012 | Gibson et al. |
| 8,166,752 | B2 | 5/2012 | Garcia et al. |
| 8,181,453 | B2 | 5/2012 | Goplen et al. |
| 8,341,948 | B2 | 1/2013 | Freese |
| 8,429,896 | B2 | 4/2013 | Pekrul et al. |
| 8,479,501 | B2 | 7/2013 | McCarthy, Jr. |
| 8,549,850 | B2 | 10/2013 | Janakiraman et al. |
| 8,661,798 | B2 | 3/2014 | Prather |
| 8,720,195 | B2 | 5/2014 | Gardner et al. |
| 8,794,300 | B2 | 8/2014 | Irmler et al. |
| 9,822,690 | B2 * | 11/2017 | Gao .............. F01N 3/05 |
| 9,995,249 | B2 * | 6/2018 | Takahashi .......... F02B 47/10 |
| 2006/0123818 | A1 * | 6/2006 | Kim ............ F25B 27/02 62/236 |
| 2009/0139217 | A1 | 6/2009 | Eifert et al. |
| 2010/0000205 | A1 | 1/2010 | Freese |
| 2010/0126155 | A1 * | 5/2010 | Garcia ............. F01N 3/05 60/317 |
| 2011/0192153 | A1 * | 8/2011 | Schmidt ............ F01N 3/05 60/317 |
| 2012/0102919 | A1 | 5/2012 | Smith et al. |
| 2012/0272640 | A1 | 11/2012 | Mungas et al. |
| 2012/0318602 | A1 | 12/2012 | Bada Ghar Wala |
| 2013/0327417 | A1 | 12/2013 | Gardner |
| 2014/0174087 | A1 * | 6/2014 | Mizoguchi .......... F01K 23/065 60/670 |
| 2014/0216370 | A1 | 8/2014 | Ichihashi |
| 2014/0223933 | A1 | 8/2014 | Steele et al. |
| 2014/0250941 | A1 | 9/2014 | Steele |
| 2015/0128578 | A1 * | 5/2015 | Helferich ......... F01N 13/143 60/320 |
| 2015/0128921 | A1 | 5/2015 | Paull |

FOREIGN PATENT DOCUMENTS

| | | |
|---|---|---|
| DE | 102012012007 A1 | 12/2012 |
| EP | 1607597 A1 | 12/2005 |
| EP | 2211038 A1 | 7/2010 |
| WO | 2008030259 A1 | 3/2008 |
| WO | 2009099399 A1 | 8/2009 |
| WO | 2013043389 A1 | 3/2013 |

OTHER PUBLICATIONS

Written Opinion for International Application No. PCT/US2016/059658; International Filing Date Oct. 31, 2016; dated Dec. 19, 2016; 6 Pages.

* cited by examiner

000
TEMPERATURE CONTROL OF EXHAUST GAS OF A TRANSPORTATION REFRIGERATION UNIT

CROSS REFERENCE TO RELATED APPLICATIONS

This application is a National Stage application of PCT/US2016/059658, filed Oct. 31, 2016, which claims the benefit of U.S. Provisional Application No. 62/256,493, filed Nov. 17, 2015, both of which are incorporated by reference in their entirety herein.

BACKGROUND

The subject matter disclosed herein relates to refrigeration systems. More specifically, the subject matter disclosed herein relates to refrigeration of cargo compartments of trucks or trailers.

A typical refrigerated truck or truck trailer, such as those utilized to transport a cargo, includes a refrigeration unit located at one end of the cargo compartment. The refrigeration unit includes a compressor, condenser, expansion valve and evaporator serially connected by refrigerant lines in a closed refrigerant circuit in accord with known refrigerant vapor compression cycles. The evaporator is located in a compartment that requires cooling, such as a cargo compartment of the truck or trailer. The condenser and compressor are located outside of the compartment. Cargo compartment air is passed over the coils of the evaporator, boiling the refrigerant flowing through the evaporator coil, thus heat is absorbed from the air in the conditioned compartment to cool the conditioned compartment. The gaseous refrigerant is then flowed to the compressor for compression thereat. A power unit, including an engine, drives the compressor of the refrigeration unit, and is typically diesel powered, or in other applications natural gas powered. In many truck/trailer transport refrigeration systems, the compressor is driven by the engine shaft either through a belt drive or by a mechanical shaft-to-shaft link. In other systems, so-called "electrically driven" systems, the engine drives a generator that generates electrical power, which in turn drives the compressor.

Exhaust gas from the engine is directed outwardly to ambient via an exhaust pipe. The exhaust gas temperature from the engine can be quite high, especially from natural gas powered engines, where the exhaust gas temperature can exceed 1000° Fahrenheit. This is problematic when the exhaust is directed toward, for example, foliage or sidewalks, nearby vehicles or the like and may result in fire or damage.

BRIEF SUMMARY

In one embodiment, a transportation refrigeration unit includes an evaporator circulating a flow of refrigerant therethrough to cool a flow of supply air flowing over the evaporator, a compressor in fluid communication with the evaporator to compress the flow of refrigerant, and an engine operably connected to the compressor to drive operation of the compressor. The engine includes an exhaust pathway to direct an exhaust gas flow from the transportation refrigeration unit, and a nozzle extending circumferentially around the exhaust pathway defining a nozzle flowpath between the exhaust pathway and the nozzle, the nozzle configured to flow a cooling airflow along the nozzle flowpath to reduce a temperature of the exhaust gas flow.

Additionally or alternatively, in this or other embodiments the nozzle includes a nozzle inlet upstream of an exhaust pathway exit, relative to a direction of flow of the exhaust gas flow through the exhaust pathway.

Additionally or alternatively, in this or other embodiments the nozzle includes a nozzle outlet downstream of an exhaust pathway exit, relative to a direction of flow of the exhaust gas flow through the exhaust pathway.

Additionally or alternatively, in this or other embodiments a mixing area is located in the nozzle downstream of the exhaust pathway exit, and is configured to allow for mixing of the exhaust gas flow with the cooling airflow to further reduce the temperature of the exhaust gas flow.

Additionally or alternatively, in this or other embodiments the nozzle is positioned at the exhaust pathway via one or more ribs extending between the nozzle and the exhaust pathway.

Additionally or alternatively, in this or other embodiments a nozzle inlet is positioned in a path of a condenser fan airflow exiting a condenser fan of the transportation refrigeration unit.

Additionally or alternatively, in this or other embodiments the engine utilizes natural gas as a fuel.

In another embodiment, a method of operating a transportation refrigeration unit includes operating a compressor to compress a flow of refrigerant in the transportation refrigeration unit and operating an engine operably connected to the compressor to drive the compressor. A flow of exhaust gas is directed away from the engine via an exhaust pathway, and a cooling airflow is flowed through a nozzle flowpath defined between the exhaust pathway and a nozzle disposed circumferentially around the exhaust pathway, thereby reducing a temperature of the flow of exhaust gas exiting the exhaust pathway.

Additionally or alternatively, in this or other embodiments the cooling airflow is flowed into the nozzle through a nozzle inlet located upstream of an exhaust pathway exit, relative to a direction of flow of the exhaust gas flow through the exhaust pathway.

Additionally or alternatively, in this or other embodiments the cooling airflow is flowed toward a nozzle outlet located downstream of an exhaust pathway exit, relative to a direction of flow of the exhaust gas flow through the exhaust pathway.

Additionally or alternatively, in this or other embodiments the cooling airflow is mixed with the flow of exhaust gas flow in a mixing area in the nozzle downstream of the exhaust pathway exit to further reduce the temperature of the flow of exhaust gas.

Additionally or alternatively, in this or other embodiments the nozzle is positioned at the exhaust pathway via one or more ribs extending between the nozzle and the exhaust pathway.

Additionally or alternatively, in this or other embodiments a nozzle inlet is positioned in a path of a condenser fan airflow exiting a condenser fan of the transportation refrigeration unit.

Additionally or alternatively, in this or other embodiments at least a portion of the condenser fan airflow is flowed into the nozzle inlet.

Additionally or alternatively, in this or other embodiments the engine utilizes natural gas as a fuel.

These and other advantages and features will become more apparent from the following description taken in conjunction with the drawings.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

The detailed description explains embodiments, together with advantages and features, by way of example with reference to the drawings.

DETAILED DESCRIPTION

Figure 1:
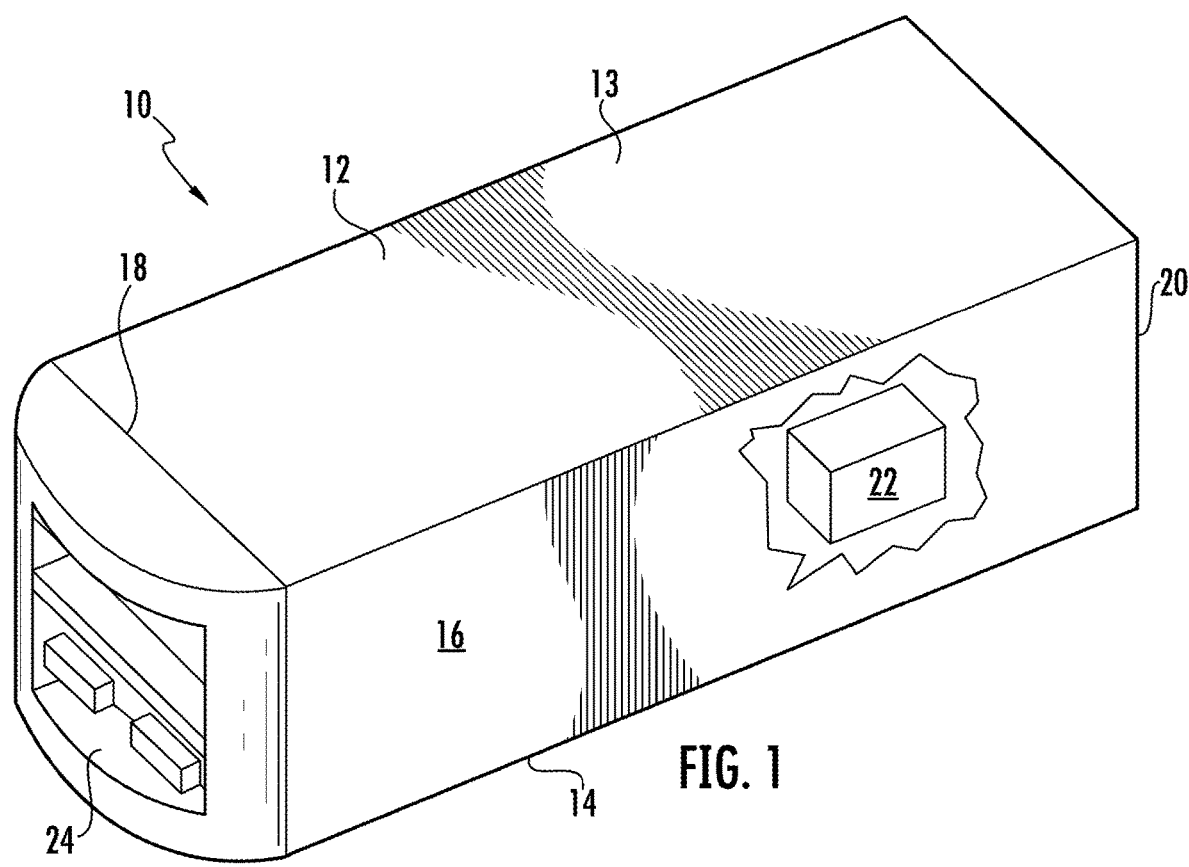
FIG. 1 is a schematic illustration of an embodiment of a refrigerated cargo compartment.

Shown in FIG. 1 is an embodiment of a refrigerated cargo compartment 10, for example, a refrigerated truck or trailer. The refrigerated cargo compartment 10 is formed into a generally rectangular construction, with a top wall 12, a directly opposed bottom wall 14, opposed side walls 16 and a front wall 18. The cargo compartment 10 further includes a door or doors (not shown) at a rear wall 20, opposite the front wall 18. The cargo compartment 10 is configured to maintain a cargo 22 located inside the cargo compartment 10 at a selected temperature through the use of a refrigeration unit 24 located at the cargo compartment 10. The cargo compartment 10 is utilized to transport the cargo 22. The refrigeration unit 24 is located at the front wall 18, and includes an evaporator 32 that receives an airflow 34 (shown in FIG. 2) from inside the cargo compartment 10 and cools it via thermal energy exchange between the airflow 34 and refrigerant flowing through the evaporator 32. The cooled airflow 34 is utilized to refrigerate the cargo compartment 10 to a selected temperature. In some embodiments, the selected temperature is in the range of about 30 to 50 degrees Fahrenheit for high or medium temperature refrigeration, while in other embodiments the selected temperature may be between 0 and −30 degrees Fahrenheit for frozen good refrigeration. It is to be appreciated that these temperatures are merely exemplary and that the refrigeration unit 24 described herein may be utilized to achieve a wide range of selected temperatures and further is readily switchable between selected temperatures.

Figure 2:
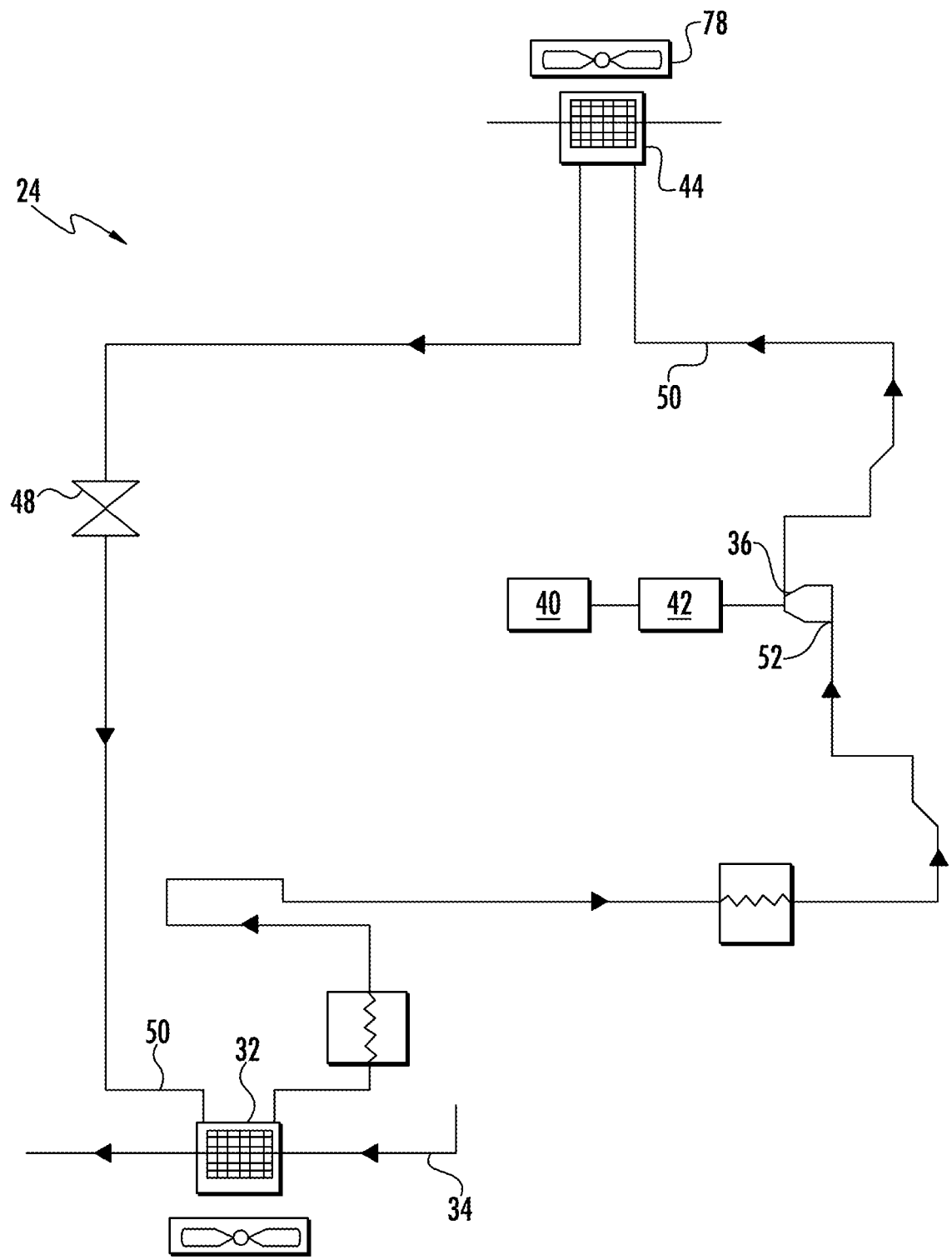
FIG. 2 is a schematic illustration of an embodiment of a refrigeration unit for a refrigerated cargo compartment.

Referring now to FIG. 2, a schematic illustration of an exemplary refrigeration unit 24 is shown. The refrigeration unit 24 includes a compressor 36 which may be a vapor injection scroll compressor, or may be a compressor of a different type. The compressor 36 is powered by a power source, for example, an engine 40, fueled by, for example diesel or natural gas. The engine 40 is connected to the compressor 36 either directly or via an intervening electrical generator 42 as shown to derive AC power to drive the compressor 36.

As stated above, the compressor 36 compresses a vapor refrigerant flow 50, and the refrigerant flow 50 changes phase into liquid at the condenser 44. The condenser 44 is fluidly connected to an expansion device 48. The expansion device 48 is fluidly connected to the evaporator 32, where the airflow 34 is cooled and the refrigerant flow 50 is boiled through thermal energy exchange at the evaporator 32. The vaporized refrigerant flow 50 is then returned to compressor inlet 52 of compressor 36.

Figure 3:
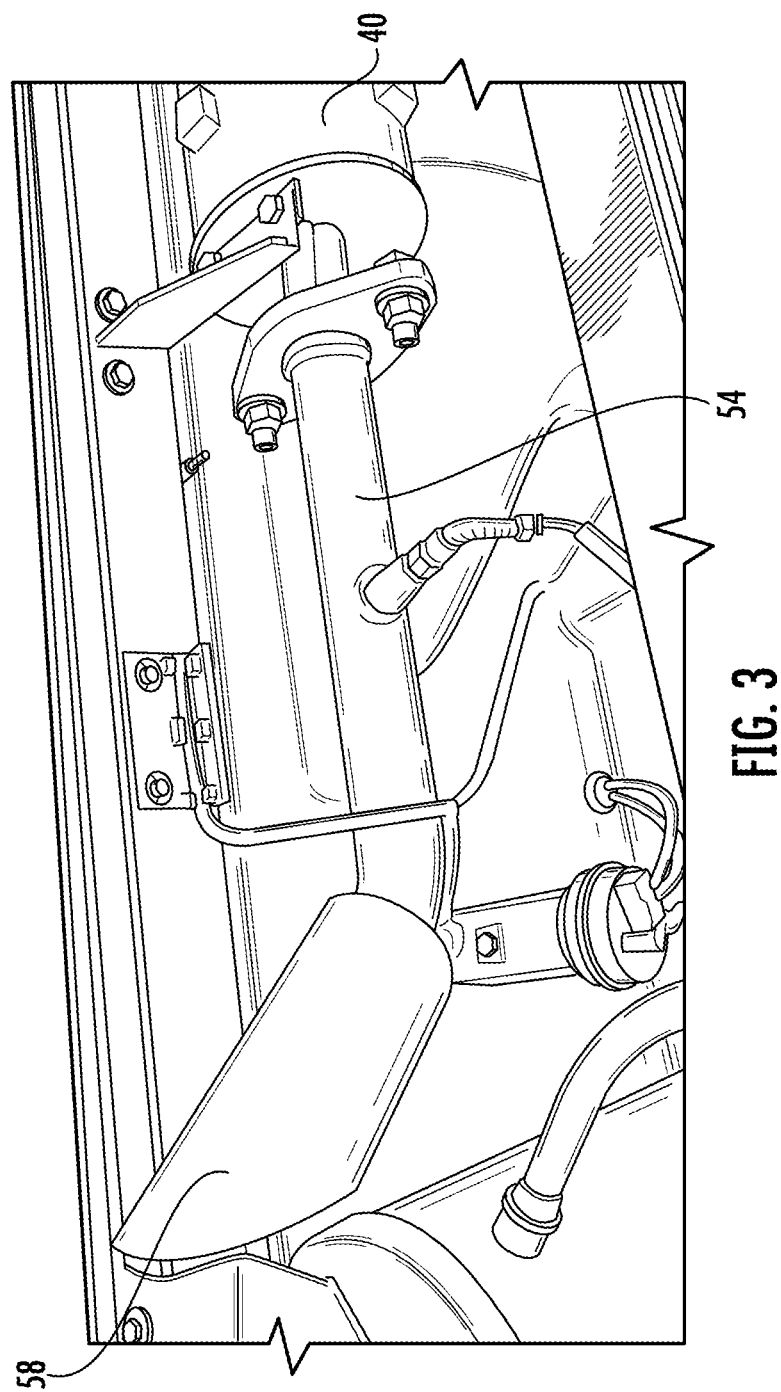
FIG. 3 is a schematic illustration of an embodiment of an exhaust arrangement for an engine of a refrigeration unit.

Referring now to FIG. 3, the engine 40 has an engine exhaust pipe 54 connected thereto to direct an exhaust gas flow 56 (shown in FIG. 4) away from the engine 40 and to the outside air. The exhaust gas flow 56, if unconditioned, exits the exhaust pipe 54 at high temperature, in some instances at about 1000° Fahrenheit. To that end, a nozzle 58 is affixed to the exhaust pipe 54 to condition and reduce the temperature of the exhaust gas flow 56.

Figure 4:
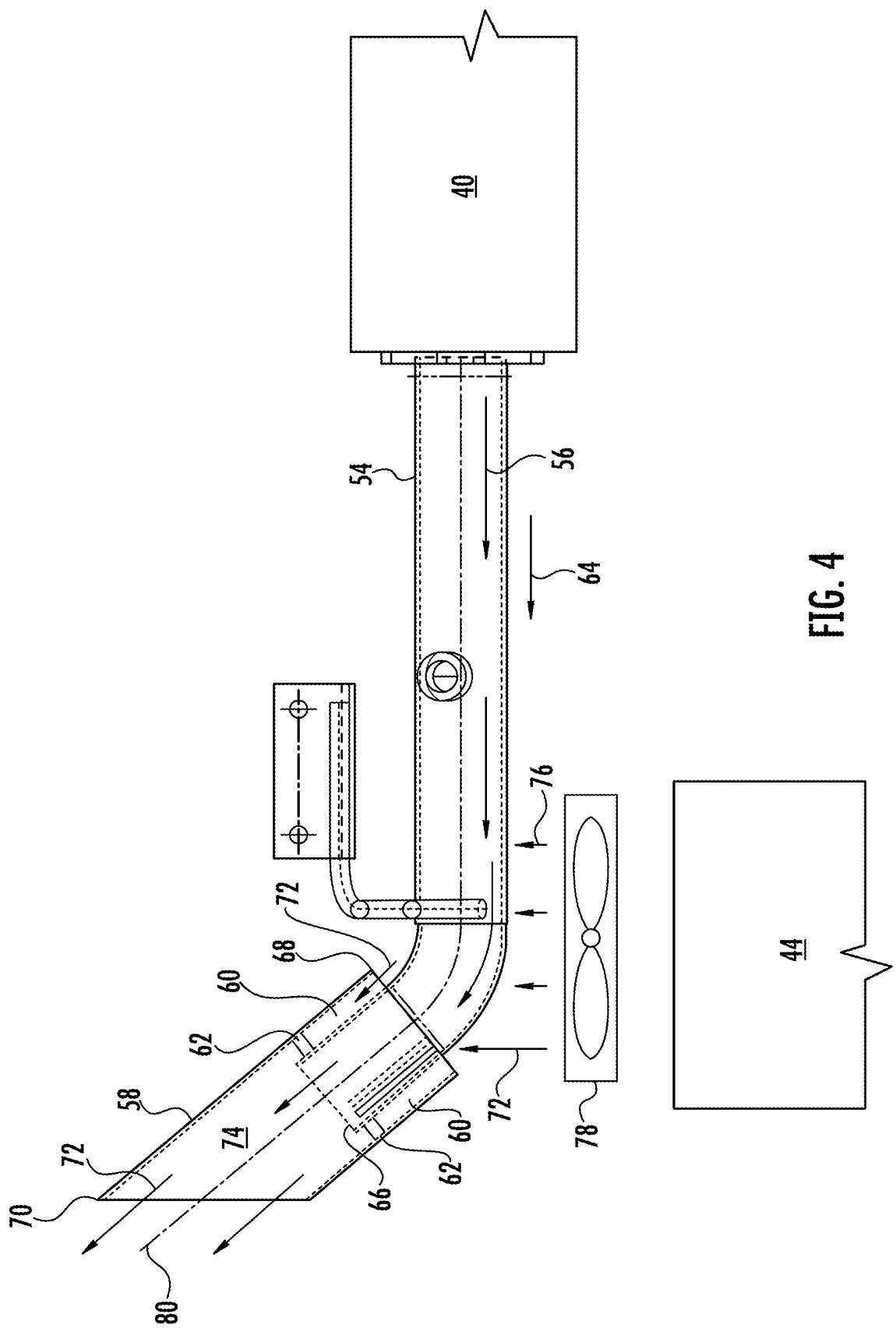
FIG. 4 is a cross-sectional view of an embodiment of an exhaust arrangement for an engine of a refrigeration unit.

Referring to the cross-sectional view of FIG. 4, the nozzle 58 extends circumferentially around the exhaust pipe 54, and is radially offset from the exhaust pipe 54 to define a nozzle flowpath 60 between the exhaust pipe 54 and the nozzle 58. In some embodiments, the nozzle 58 is positioned by one or more ribs 62 extending between the exhaust pipe 54 and the nozzle 58. In other embodiments, the nozzle 58 is supported while not being attached to the exhaust pipe 54 by, for example, one or more brackets connecting the nozzle 58 to support structure of the refrigeration unit 24. In some embodiments, the nozzle 58 is formed from stainless steel, selected for its corrosion resistance and heat resistance properties, but one skilled in the art will readily appreciate that other suitable materials may be utilized.

Figure 5:
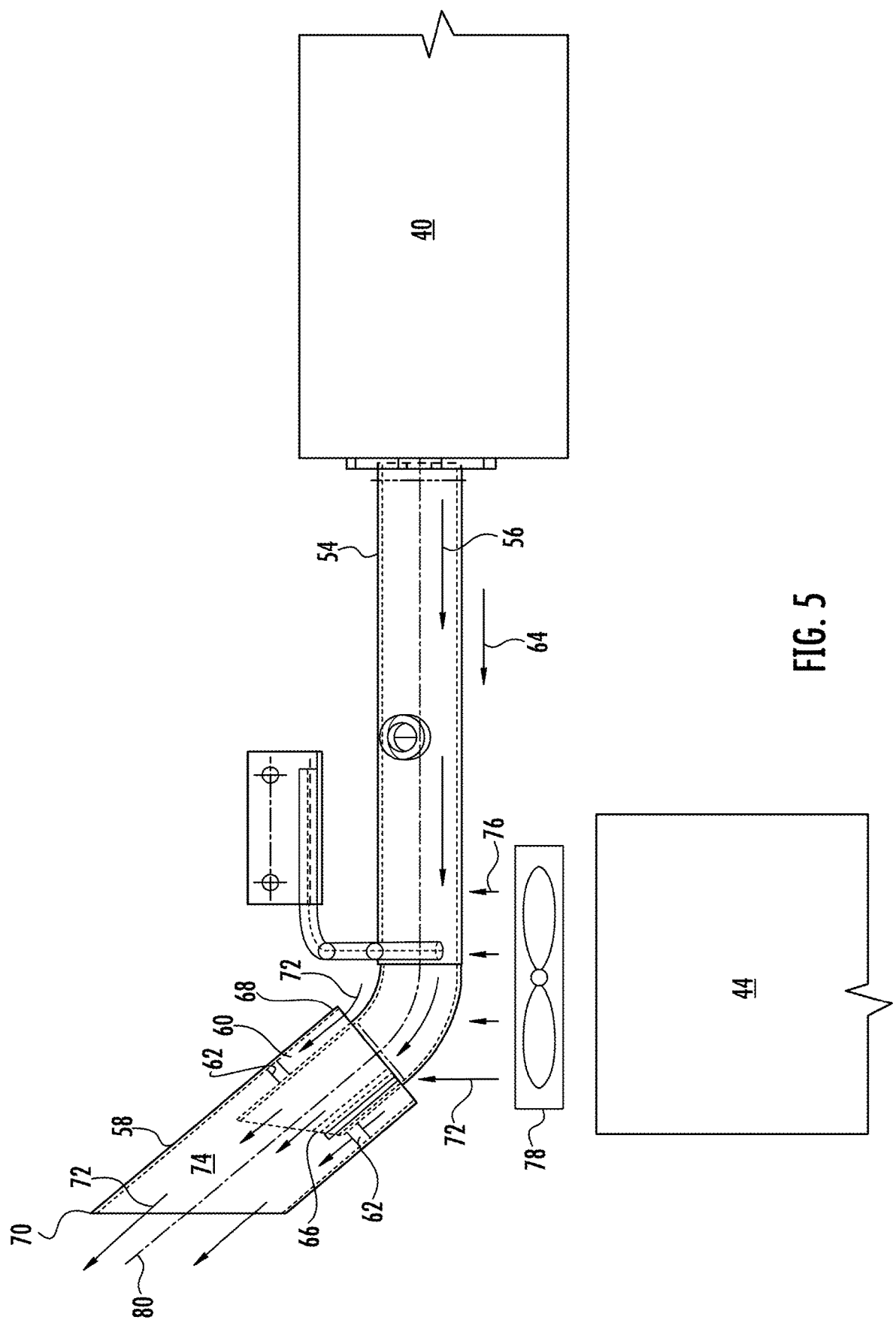
FIG. 5 is a cross-sectional view of another embodiment of an exhaust arrangement for an engine of a refrigeration unit.

The exhaust gas flow 56 flows along the exhaust pipe 54 in a flow direction 64 toward an exhaust pipe exit 66. The nozzle 58 has a nozzle inlet 68 upstream of the exhaust pipe exit 66 and a nozzle outlet 70 downstream of the exhaust pipe exit 66, relative to the flow direction 64. The nozzle configuration draws a cooling airflow 72 into the nozzle 58 via the nozzle inlet 68 and through the nozzle 58 toward a mixing area 74 inside of the nozzle 58, downstream of the exhaust pipe exit 66. The cooling airflow 72 mixes with the exhaust gas flow 56 reducing a temperature of the exhaust gas flow 56 before the exhaust gas flow 56 exits the nozzle 58 via the nozzle outlet 70. In the embodiment of FIG. 4, the exhaust pipe exit 66 is trimmed perpendicular to a pipe axis 80, while in other embodiments, such as shown in FIG. 5, the exhaust pipe exit 66 is trimmed non-perpendicular to the pipe axis 80 to further improve mixing of the cooling airflow 72 with the exhaust gas flow 56 in the mixing area 74.

In some embodiments, the nozzle 58 is located to take advantage of a condenser fan airflow 76 exiting a condenser fan 78 of the refrigeration unit 24. The nozzle inlet 70 is positioned in a path of the condenser fan airflow 76 such that at least a portion of the condenser fan airflow 76, accelerated by the condenser fan 78, into the nozzle inlet 70. This increased velocity airflow into the nozzle 58 increases the cooling of the exhaust gas flow 56.

The disclosed nozzle 58 exhibits a temperature reduction of exiting exhaust gas temperature when measured 6 inches from the nozzle outlet 70, when compared to exhaust gas temperature when measured 6 inches from an exit of a typical exhaust pipe. In some cases, the exhaust gas temperature reduction is in the range of 50-60%.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in scope. Additionally, while various embodiments have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A transportation refrigeration unit comprising:
an evaporator circulating a flow of refrigerant therethrough to cool a flow of supply air flowing over the evaporator;
a compressor in fluid communication with the evaporator to compress the flow of refrigerant;
an engine operably connected to the compressor to drive operation of the compressor, the engine including:
an exhaust pathway to direct an exhaust gas flow from the transportation refrigeration unit;
a nozzle extending circumferentially around the exhaust pathway defining a nozzle flowpath between the exhaust pathway and the nozzle, the nozzle configured to flow a cooling airflow along the nozzle flowpath to reduce a temperature of the exhaust gas flow; and
a condenser fan configured to direct the cooling airflow from a condenser of the transportation refrigeration unit into the nozzle flowpath.

2. The transportation refrigeration unit of claim 1, wherein the nozzle includes a nozzle inlet upstream of an exhaust pathway exit, relative to a direction of flow of the exhaust gas flow through the exhaust pathway.

3. The transportation refrigeration unit of claim 1, wherein the nozzle includes a nozzle outlet downstream of an exhaust pathway exit, relative to a direction of flow of the exhaust gas flow through the exhaust pathway.

4. The transportation refrigeration unit of claim 3, further comprising a mixing area in the nozzle downstream of the exhaust pathway exit, configured to allow for mixing of the exhaust gas flow with the cooling airflow to further reduce the temperature of the exhaust gas flow.

5. The transportation refrigeration unit of claim 1, wherein the nozzle is positioned at the exhaust pathway via one or more ribs extending between the nozzle and the exhaust pathway.

6. The transportation refrigeration unit of claim 1, wherein a nozzle inlet is positioned in the path of a condenser fan airflow exiting the condenser fan of the transportation refrigeration unit.

7. The transportation refrigeration unit of claim 1, wherein the engine utilizes natural gas as a fuel.

8. A method of operating a transportation refrigeration unit comprising:
operating a compressor to compress a flow of refrigerant in the transportation refrigeration unit;
operating an engine operably connected to the compressor to drive the compressor;
directing a flow of exhaust gas away from the engine via an exhaust pathway; and
flowing a cooling airflow through a nozzle flowpath defined between the exhaust pathway and a nozzle disposed circumferentially around the exhaust pathway, thereby reducing a temperature of the flow of exhaust gas exiting the exhaust pathway;
wherein a condenser fan is configured to direct the cooling airflow from a condenser of the transportation refrigeration unit into the nozzle flowpath.

9. The method of claim 8, further comprising flowing the cooling airflow into the nozzle through a nozzle inlet disposed upstream of an exhaust pathway exit, relative to a direction of flow of the exhaust gas flow through the exhaust pathway.

10. The method of claim 8, further comprising flowing the cooling airflow toward a nozzle outlet disposed downstream of an exhaust pathway exit, relative to a direction of flow of the exhaust gas flow through the exhaust pathway.

11. The method of claim 10, further comprising mixing the cooling airflow with the flow of exhaust gas flow in a mixing area in the nozzle downstream of the exhaust pathway exit to further reduce the temperature of the flow of exhaust gas.

12. The method of claim 8, further comprising positioning the nozzle at the exhaust pathway via one or more ribs extending between the nozzle and the exhaust pathway.

13. The method of claim 8, further comprising positioning a nozzle inlet in a path of the condenser fan airflow exiting the condenser fan of the transportation refrigeration unit.

14. The method of claim 13, further comprising flowing at least a portion of the condenser fan airflow into the nozzle inlet.

15. The method of claim 8, wherein the engine utilizes natural gas as a fuel.

* * * * *